(12) United States Patent
Nishimura et al.

(10) Patent No.: US 7,312,170 B2
(45) Date of Patent: Dec. 25, 2007

(54) OPTICAL SYNTHETIC QUARTZ GLASS AND METHOD FOR PRODUCING THE SAME

(75) Inventors: Hiroyuki Nishimura, Koriyama (JP); Akira Fujinoki, Koriyama (JP)

(73) Assignees: Heraeus Quarzglas GmbH & Co. KG, Hanau (DE); Shin-Etsu Quartz Products Co., Ltd., Tokyo (JP)

( * ) Notice: Subject to any disclaimer, the term of this patent is extended or adjusted under 35 U.S.C. 154(b) by 240 days.

(21) Appl. No.: 10/548,237

(22) PCT Filed: Mar. 3, 2004

(86) PCT No.: PCT/EP2004/002190

§ 371 (c)(1),
(2), (4) Date: Sep. 2, 2005

(87) PCT Pub. No.: WO2004/078663

PCT Pub. Date: Sep. 16, 2004

(65) Prior Publication Data

US 2006/0183622 A1    Aug. 17, 2006

(30) Foreign Application Priority Data

Mar. 6, 2003  (JP) .............................. 2003-059381

(51) Int. Cl.
| | | |
|---|---|---|
| C03C 3/06 | (2006.01) | |
| C03B 37/07 | (2006.01) | |
| C03B 37/075 | (2006.01) | |
| C03B 37/018 | (2006.01) | |

(52) U.S. Cl. ............................ 501/54; 501/53; 65/17.1; 65/17.2; 65/30.1; 65/384; 65/397; 65/424

(58) Field of Classification Search .................. 501/53, 501/54; 65/17.1, 30.1, 17.2, 384, 397, 424
See application file for complete search history.

(56) References Cited

U.S. PATENT DOCUMENTS

| 5,326,729 A * | 7/1994 | Yaba et al. .................... 501/54 |
| 6,333,284 B1 * | 12/2001 | Otsuka et al. ................. 501/54 |
| 6,451,719 B1 | 9/2002 | Yamagata |

FOREIGN PATENT DOCUMENTS

| EP | 1094040 A2 * | 4/2001 |
| JP | 01-028240 | 1/1989 |
| JP | 02-069332 | 3/1990 |
| JP | 11-116248 | 4/1999 |
| JP | 11-302025 | 11/1999 |
| JP | 2000-026125 | 1/2000 |
| JP | 2000-143252 | 5/2000 |
| JP | 2000-191331 | 7/2000 |
| JP | 2000-264671 | 9/2000 |
| JP | 2001-019450 | 1/2001 |
| JP | 2001-114529 | 4/2001 |

OTHER PUBLICATIONS

Patent Abstracts of Japan, vol. 2000, No. 12, Jan. 3, 2001, for JP 2000 264671 A (Sep. 26, 2000).
Patent Abstracts of Japan, vol. 2000, No. 02, Feb. 29, 2000, for JP 11 302025 A (Nov. 2, 1999).
Patent Abstracts of Japan, vol. 2000, No. 04, Aug. 31, 2000, for JP 2000 026125 A (Jan. 25, 2000).
Patent Abstracts of Japan, vol. 2000, No. 10, Nov. 17, 2000, for JP 2000 191331 A (Jul. 11, 2000).
Patent Abstracts of Japan, vol. 013, No. 211 (C-597), May 17, 1989, for JP 01 028240 A (Jan. 30, 1989).
Patent Abstracts of Japan, vol. 2000, No. 16, May 8, 2001, for JP 2001 019450 A (Jan. 23, 2001).
Patent Abstracts of Japan, vol. 2000, No. 08, Oct. 6, 2000, for JP 2000 143252 A (May 23, 2000).
Patent Abstracts of Japan, vol. 1999, No. 09, Jul. 30, 1999, for JP 11 116248 A (Apr. 27, 1999).
Patent Abstracts of Japan, for JP 2001-114529 (Apr. 24, 2001).
Patent Abstracts of Japan, for JP 02-069332 (Mar. 8, 1990).
Khotimchenko, V.S. et al., "Determining the Content of Hydrogen Dissolved in Quartz Glass Using . . . ", Zhurnal Prikladnoi Spektroskopii, vol. 46, No. 6, pp. 987-991, Jun. 1987.

* cited by examiner

Primary Examiner—Anthony J. Green
(74) Attorney, Agent, or Firm—Tiajoloff & Kelly (57) ABSTRACT

The present invention provides an optical synthetic quartz glass material which substantially does not cause changes in transmitted wave surface (TWS) by solarization, compaction (TWS delayed), rarefaction (TWS progressed) and photorefractive effect when ArF excimer laser irradiation is applied at a low energy density, e.g. at energy density per pulse of 0.3 mJ/cm$^2$ or less. The present invention further provides a method for manufacturing the same. In order to solve the above-mentioned problems, the optical synthetic quartz glass material of the present invention is characterized in that, in a synthetic quartz glass prepared by a flame hydrolysis method using a silicon compound as a material, the followings are satisfied that the amount of SiOH is within a range of more than 10 ppm by weight to 400 ppm by weight, content of fluorine is 30 to 1000 ppm by weight, content of hydrogen is $0.1 \times 10^{17}$ to $10 \times 10^{17}$ molecules/cm$^3$ and, when the amounts of SiOH and fluorine are A and B, respectively, total amount of A and B is 100 ppm by weight or more and B/A is 0.25 to 25.

3 Claims, 4 Drawing Sheets

OPTICAL SYNTHETIC QUARTZ GLASS AND METHOD FOR PRODUCING THE SAME

TECHNICAL FIELD TO WHICH THE INVENTION BELONGS

The present invention relates to an optical synthetic quartz glass material showing excellent light transmission and homogeneity for a long period to irradiation of ultraviolet ray, particularly KrF and ArF excimer lasers and also to a method for manufacturing the same. More particularly, the present invention especially relates to a synthetic quartz glass material which is advantageously used in lenses or other optical parts for an exposure apparatus of lithography using excimer laser for the manufacture of semiconductor chips, prism for making the band narrow used for an excimer laser itself, common optical parts, lens, beam splitter, prism, etc. to be used for KrF and ArF excimer lasers, etc. and also to a method for manufacturing the same.

RELATED ART

In recent years, manufacture of LSI (Large Scale Integrated Circuits) by a KrF excimer laser lithography has been carried out in earnest and, as an exposure technology for the next generation, development is being carried out for realization of an ArF excimer laser lithography. In a lithography technology, there is a demand for finer processing from a strong request for higher integration of semiconductor chips and for less consumption of electric power and, year by year, there is a demand for exposure apparatus having high resolving power. In addition, for improvement of productivity of semiconductors, improvement of throughput of exposure machine is demanded at the same time. In order to meet such demands, several exposure systems called an ultra-resolution technique have been invented whereby improvement in resolving power has been achieved. With regard to exposure wavelength, a KrF laser of 248.3 nm was used but, in recent years, exposure apparatus using an ArF laser (193.4 nm) has appeared for a large-scale production for a purpose of improvement of resolving power.

With regard to a quartz glass material for an ArF excimer laser exposure apparatus, further improvement in quality has been demanded as compared with that for KrF. When the generally demanded optical characteristics are listed, they are as follows.

1) High light transmission at 193.4 nm;
2) Homogeneity of refractive index is to be high;
3) Double refraction is to be low; and
4) To be stable against irradiation of ArF (resistance to laser).

Since synthetic quartz glass usually has a good transmission of ultraviolet ray, it has been used in many fields as an ultraviolet-transmitting material and, in a KrF exposure apparatus, synthetic quartz glass has been used as a transmission material in nearly all cases without exception. However, as compared with KrF, an ArF excimer laser is with shorter wavelength and, therefore, light of shorter wavelength is to be transmitted and, in addition, damage is apt to happen in quartz glass by irradiation of laser because of higher photon energy than KrF. Thus, there is a demand for higher resistance to laser.

In order to improve the above-mentioned optical characteristics, many studies and developments have been carried out up to now. For example, the cause for worsening the light transmission of 1) is structural defect and metallic impurities in quartz glass. Accordingly, attempts for making the manufacturing steps optimum and clean have been carried out so that such defect and impurities are made as low as possible. At the same time, many studies and developments have been also carried out for resistance to laser of 3). The term resistance to laser used here usually means that, upon irradiation of laser, optical characteristics such as transmissivity, homogeneity and double refraction are stable for a long period.

There are several damages resulted by irradiation of laser and they are listed as follows.

1) lowering of transmissivity by formation of structural defect (solarization); and
2) changes in transmitted wave surface by structural change Further, changes in transmitted wave surface are resulted by the progress of the following three damages.

a) damage where density of the irradiated area increases and volume decreases (compaction);
b) damage where density of irradiated area decreases and volume increases (rarefaction); and
c) damage where, although volume of irradiated area does not change, transmitted wave surface progresses (photorefractive effect).

Here, changes in transmitted wave surface mean that refractive index of quartz glass of the irradiated area changes. Thus, when the transmitted wave surface is delayed, the refractive index of such an area becomes big while, when the transmitted wave surface progresses, the refractive index becomes small. When changes in the refractive index are resulted only in a part of the lens (irradiated area) by damage caused by laser irradiation, that greatly affects the imaging property and a correct pattern is unable to be imaged. Therefore, in order to keep a high imaging property, it is not only necessary to use a quartz glass material having a high refractive index homogeneity, but also the selection of a material where the refractive index thereof does not change by laser irradiation or, in other words, transmitted wave surface does not change is important.

Up to now, there have been many proposals for a method of reduction of solarization or compaction of the above-mentioned damage. There have been disclosed many methods such as a method where the condition in the synthesis of quartz glass is made optimum for suppressing the generation of solarization and compaction, a thermal treatment under a specific atmosphere and a method where hydrogen atom or fluorine is doped.

To be specific, there are described in Japanese patent applications JP-A-2000-143252 and JP-A-11-116248 that a predetermined amount of fluorine is doped whereby reduction of transmissivity and generation of compaction upon irradiation of ultraviolet ray can be suppressed. In JP-A-2000-191331, there is described that, when molar ratio of hydrogen to oxygen of oxyhydrogen flame in the synthesis of quartz glass by a direct method is 2.2 or more and when the synthesized quartz glass where SiOH in the resulting quartz glass is 1,000 ppm by weight or more is heated at 1500° C. or higher, there is prepared a quartz glass where solarization hardly takes place even when a high intensity of ArF excimer laser is irradiated for long time. Further, in Japanese Patent JP 3,069,562, there is described that, when concentration of metal impurities is decreased than that in conventional case and SiOH, hydrogen molecule and fluorine are contained therein in amounts of 1 to 100 ppm by weight (SiOH), $5 \times 10^{16}$ to $1 \times 10^{19}$ molecules/cm³ (hydrogen content) and 50 to 10,000 ppm by weight (fluorine content), respectively, there is prepared a quartz glass material having a high resistance to irradiation which is durable against the irradiation by excimer laser or excimer lamp for long time. Besides those, there are also proposed methods where generation of the above-mentioned solarization and compaction is suppressed.

However, in a damage where change in the transmitted wave surface is resulted, there has been rarely referred to the improvement in the damage concerning b) rarefaction and c) photorefractive effect That is because, while the compaction of a) is a damage which is observed under a condition where energy density of laser irradiation is relatively high, the damages of b) and c) are behaviors which are firstly observed upon irradiation of low energy density near the laser energy transmitting through the quartz glass in the actual exposing machine and, up to now, there has not been found experimentally for a long period.

To be more specific, the damages of b) and c) are generated by irradiation of low energy density where energy density per pulse of ArF laser is about 0.3 mJ/cm$^2$p or less. In the studies for improvement in resistance to laser in the past, the improvement has been mainly carried out paying attention on the fact how compaction and reduction of transmissivity are to be improved. That is because, in evaluating the laser resistance, a method where irradiation is conducted at higher energy density than the energy density of the laser used in actual exposing machine for shortening the evaluation time whereby damage is positively applied to the quartz glass to evaluate (accelerated test) is common. Therefore, under such an irradiation condition, damages caused by rarefaction and photorefractive effect are not observed and there has been rarely reported about them.

PROBLEMS THAT THE INVENTION IS TO SOLVE

However, the most important thing for the irradiation damage of quartz glass is not the result of the accelerated test by laser irradiation of the conventional high energy density but is the fact that what damage is generated in what degree when irradiation is applied under the condition of the energy density which is near the energy density used in the actual exposing machine. In the irradiation test by high energy density up to now, compaction is mostly a dominant damage although, in the case of low energy density, it is necessary to take rarefaction and photorefractive effect into consideration and, therefore, it is likely that the damage mechanism which has been mentioned up to now is entirely different Thus, in the conventional design for a purpose of preparing a quartz material having a good resistance to compaction, that may not be applicable. In other words, it is necessary to design a material having not only anti-compaction characteristic but also high resistance to rarefaction and photorefractive effect.

An object of the present invention is to provide an optical synthetic quartz glass material having a high anti-laser property which is able to be appropriately used as an optical material for exposing machine when ArF excimer laser is irradiated at the energy density which is used in actual exposing machine or, to be specific, at energy density per pulse of 0.3 mJ/cm$^2$p or less and also to provide a method for manufacturing the same. To be more specific, the present invention provides an optical synthetic quartz glass material which substantially does not cause changes in transmitted wave surface by solarization, compaction, rarefaction and photorefractive effect when irradiation is applied at a low energy density and also provides a method for manufacturing the same.

MEANS FOR SOLVING THE PROBLEMS

In order to solve the above-mentioned problems, the optical synthetic quartz glass material of the present invention is characterized in that, in a synthetic quartz glass prepared by a flame hydrolysis method using a silicon compound as a material, the followings are satisfied that the amount of SiOH is within a range of more than 10 ppm by weight to 400 ppm by weight, content of fluorine is 30 to 1000 ppm by weight, content of hydrogen is $0.1 \times 10^{17}$ to $10 \times 10^{17}$ (molecule numbers/cm$^3$) and, when the amounts of SiOH and fluorine are A and B, respectively, total amount of A and B is 100 ppm by weight or more and B/A is 0.25 to 25.

The synthetic quartz glass material of the present invention has a characteristic that, when ArF excimer laser is irradiated at not less than $1 \times 10^{10}$ pulses where energy density per pulse is not more than 0.3 mJ/cm$^2$, changes in the transmitted wave surface at 632.8 nm are within a range of −0.5 to +0.5 nm per cm of the thickness of the synthetic quartz glass material.

Further, the synthetic quartz glass material of the present invention has a characteristic that, when ArF excimer laser is irradiated at $1 \times 10^7$ pulses where energy density per pulse is 10 mJ/cm$^2$p, changes in the transmitted wave surface at 632.8 nm are within a range of 0 to +5 nm per cm of the thickness of the synthetic quartz glass material.

In the synthetic quartz glass material of the present invention, there is no cord in three directions and the material has the following physical properties that, the internal transmissivity per cm of thickness of the synthetic quartz glass at 193.4 nm is 99.75% or more, maximum value of double refraction at 632.8 nm is 0.5 nm/cm and homogeneity of the refractive index Δn [difference (Δn) between maximum value and minimum value of refractive index] is $2 \times 10^{-6}$ or less.

A method for the manufacture of the synthetic quartz glass material of the present invention is characterized by containing the following steps a) to f).

a) a step where a volatile silicon compound is hydrolyzed by oxyhydrogen flame and the resulting fine particles of silica are sedimented on a heat-resistant substrate to prepare a porous mother material;

b) a step where the porous mother material is allowed to stand in an atmosphere containing a fluorine compound so that fluorine is contained in the porous mother material;

c) the porous mother material is kept at 1673 K or higher in vacuo or in an inert gas-containing atmosphere to prepare a transparent quartz glass;

d) a step where the transparent quartz glass is hated at the temperature of a softening point at the lowest and external force is applied to deform whereupon cords are removed;

e) a step where the quartz glass wherefrom the cords are removed is once kept at the temperature which is an annealing point or higher and, after that, subjected to a slow cooling whereupon a virtual temperature is set at 1073 K to 1323 K; and f) a step where the quartz glass in which the virtual temperature is set at 1073 K to 1323 K is subjected to a thermal treatment at the temperature of 523 K to 773 K in a hydrogen gas-containing atmosphere so that hydrogen molecules are contained therein.

MODE FOR CARRYING OUT THE INVENTION

As hereunder, mode for carrying out the present invention will be illustrated on the basis of the attached drawings although it goes without saying that the mode for carrying out the present invention as such is shown in an exemplified manner and that various modifications thereof are possible so far as they are not outside of the technical idea of the present invention.

The optical synthetic quartz glass material of the present invention is a synthetic quartz glass prepared by means of a flame hydrolysis method using a silicon compound as a material and the amount of SiOH is within a range of more than 10 ppm by weight to 400 ppm by weight, content of fluorine is 30 to 1,000 ppm by weight, content of hydrogen is $0.1 \times 10^{17}$ to $10 \times 10^{17}$ (molecule numbers/cm$^3$) and, when the amounts of SiOH and fluorine are A and B, respectively, total amount of A and B is 100 ppm by weight or more and B/A is 0.25 to 25.

With regard to the behavior of the transmitted wave surface when ArF laser is irradiated at a low energy density, the present inventors have conducted a test for quartz glass prepared under several different manufacturing parameters and found that, in order to make the rarefaction resistance good, concentration of SiOH is a particularly important physical property. It has also been found that, when not only SiOH concentration of course but also others such as hydrogen concentration and fluorine concentration are made optimum, a totally optimized quartz material is prepared where damages such as solarization, compaction and rarefaction are hardly resulted upon irradiation of low energy density.

Thus, it has been found that a quartz glass material having an excellent laser resistance can be prepared when amount of SiOH is made within a range of more than 10 ppm by weight to 400 ppm by weight and fluorine and hydrogen molecules are contained therein in 30 to 1,000 ppm by weight and $0.1 \times 10^{17}$ to $10 \times 10^{17}$ (molecules/cm$^3$), respectively. It has been further found that an optical synthetic quartz glass material which is able to be appropriately used as an optical material for an actual ArF excimer laser exposing machine can be prepared when amount of SiOH is made within a range of more than 10 ppm by weight to 300 ppm by weight and fluorine and hydrogen molecules are contained therein in 30 to 200 ppm by weight and $0.5 \times 10^{17}$ to $5 \times 10^{17}$ molecules/cm$^3$, respectively.

In the quartz glass material as such, changes in the transmitted wave surface at 632.8 nm per cm of the thickness of the quartz glass are within a range of −0.5 to +0.5 nm even when ArF excimer laser having energy density of 0.3 mJ/cm$^2$p per pulse or less is irradiated at $1 \times 10^{10}$ pulses whereby it has been found that the material is in such a level that being appropriately used as an optical material for an ArF excimer laser exposing apparatus.

When it is used for a relatively high energy density, compaction is dominant in the damage while, in the optical synthetic quartz glass material of the present invention, changes in the transmitted wave surface per cm of the thickness of the quartz glass when $1 \times 10^7$ pulses were irradiated at an energy density of 10 mJ/cm$^2$p are also within a range of 0 to +5 nm and such a range was a level which is able to be appropriately used for an illumination part of an ArF excimer exposing apparatus.

Although a damage mechanism of rarefaction and photorefractive effect has not been clarified yet, it has already been known from experiments that amounts of SiOH and hydrogen molecule are dominant causes and that a significant generation is noted in quartz glass containing many such structures.

The optimum range of SiOH is from more than 10 ppm by weight to 400 ppm by weight and, preferably, it is preferred that the maximum value is set at up to around 300 ppm by weight When SiOH is too low, oxygen defect such as Si—Si is apt to happen and there is a risk of deterioration of resistance to transmittance and to solarization. In addition, damage due to compaction upon ArF laser irradiation is apt to happen and, therefore, it is preferred that SiOH is contained in at least more than 10 ppm by weight.

Although the means that hydrogen molecules are contained therein is an effective method for giving a resistance to solarization which will be mentioned later, high concentration of hydrogen molecule is believed to be one of the causes for resulting in rarefaction. From the viewpoint of rarefaction, the maximum value of the hydrogen concentration is to be set at around $1 \times 10^{18}$ molecules/cm$^3$.

On the other hand, doping of hydrogen molecules and fluorine is effective for enhancing the resistance to compaction and solarization. Generally, solarization is caused by generation of paramagnetic defect resulted by excimer laser irradiation. The paramagnetic defect which particularly affects 193.4 nm is a structure called an E' center (Si.) and has a broad absorption band where a central wavelength is 210 to 215 nm. Mechanism for the production of the E' center is believed to be as follows:

$$SiO_2 \rightarrow Si. + SiO.$$

With regard to a bond energy of SiO$_2$, it will not usually happen that a bond is cleaved by a photon energy of 193.4 nm but, in a short-pulse laser such as an excimer laser, light of high intensity is irradiated within short time and, therefore, damage proceeds by a two-photon absorption. Thus, production rate of the E' center is greatly dependent upon the energy density of the laser and it has been confirmed that, generally, solarization proceeds in proportion to the square of the energy density. Accordingly, especially when laser beam having strong energy is irradiated, large quantities of E' centers are produced whereby transmissivity suddenly lowers. Under the condition of use of actual exposing machine, energy of laser transmitting the quartz glass material is considerably low and, therefore, progress of solarization is not so quick but, usually, exposing apparatus is a machine which is used for a very long period whereby transmittance of the laser gradually worsens and the apparatus is becoming unusable.

Although it is believed that hydrogen molecules are dispersed in an SiO$_2$ network, it is believed that generation of absorption is suppressed by changing the deficient Si. and SiO. produced together with laser irradiation to SiH and SiOH. As such, in order to eliminate the deficient species resulted by the laser irradiation, it is necessary that hydrogen molecules in more than a certain amount are contained. It has been known that, when the hydrogen molecule species are too little, hydrogen to be bonded is insufficient to the resulting deficiency whereby the effect is insufficient while, when hydrogen molecules are too much, resistance to rarefaction is deteriorated and the initial transmissivity of the ultraviolet region is lowered (refer, for example, to JP-A-02-069,332). Accordingly, R is preferred that the optimum amount of hydrogen molecules is set within a range of $1 \times 10^{16}$ to $1 \times 10^{18}$ molecules/cm$^3$. With regard to the amount of hydrogen molecule, it is more preferred to set corresponding to the energy density of the laser beam transmitting through quartz glass and it is important to set at almost the above-mentioned concentration range.

Fluorine also contributes in improvement in resistance to solarization and compaction as same as hydrogen molecule does. Doping of fluorine may be carried out in any stage of the manufacturing steps although a method where a thermal treatment is carried out in a fluorine-containing atmosphere in a stage of the so-called porous mother material in which fine particles of silica prepared by a flame hydrolysis method of a silicon compound are sedimented is common. The fluorine-containing compound used here is, for example, $SiF_4$, $SF_6$, $F_2$ or the like and it is diluted with an inert gas whereupon a fluorine-containing atmosphere gas can be prepared.

When fluorine is doped, Si—F bond is resulted in various areas of an $SiO_2$ network structure. Bond energy of Si—F bond is considerably high even as compared with bond energy of $SiO_2$ network and cleavage of the bond hardly takes place by excimer laser. It is believed that, when fluorine is distributed among the $SiO_2$ network in a certain concentration, an effect of assisting the relaxation of the network structure per se of $SiO_2$ works and bond angle and bond distance of the $SiO_2$ structure are apt to take stable structures whereby the network structure per se is more stabilized than the common pure quartz glass.

Although it is believed that solarization is resulted by the formation of E' center by cleavage of the bond of $SiO_2$ by laser, it is believed that, when a small amount of fluorine is contained, the $SiO_2$ network structure is stabilized and accordingly that solarization hardly takes place. Actually, in a quartz glass where a certain amount of fluorine is doped, resistance to solarization is improved.

Fluorine also has an effect of enhancing the resistance to compaction. In compaction, density of the area to which laser is irradiated becomes high and the irradiated area shrinks whereupon changes in the transmitted wave surface are generated but the bigger influence is that a big tensile stress is resulted near the boundary of the areas where laser is irradiated and is not irradiated and a very big double refraction is resulted at the boundary area. When the stress at the boundary resulted by the shrinkage of volume is well released, generation of double refraction can be suppressed. For example, setting of OH high is effective for release of the stress but, in that case, there is a risk of deterioration of resistance to rarefaction. In the quartz glass to which fluorine is doped, the above-mentioned release of stress effectively works as well and double refraction due to laser irradiation hardly takes place. Although the details of the mechanism are ambiguous, it is likely that, as same as in the case of SiOH, the Si—F bond which is isolated from the $SiO_2$ network effectively works as a site which well releases the stress to the deformation.

When appropriate amounts of fluorine and SiOH are contained as such, it is possible to prepare a material having a high laser resistance and the present inventors paid their attention to the concentrations thereof and found that their absolute amounts and their existing ratio particularly give a big influence on laser resistance. Thus, when predetermined amounts of fluorine and SiOH are present together, a material having a good laser resistance is prepared. To be specific, when the amount of SiOH is a and that of fluorine b, it is preferred that the total amount of a and b is 100 ppm by weight or more and that b/a satisfies 0.25 to 25.

The above means that their coexistence within a range of predetermined ratio is preferred over the existence of any one of them. There are many problems that, when only SiOH is made present in large amounts, resistance to laser or, particularly, resistance to rarefaction which is a problem upon irradiation of low-energy density is deteriorated and that, on the other hand, when only fluorine is made present in a high concentration, transmissivity of ultraviolet region is deteriorated due to generation of $F_2$ gas and to oxygen-deficient type deficiency by a thermal treatment In order to satisfy those optical characteristics, it is important that more than predetermined amounts of SiOH and fluorine are made co-existed at the same time. Accordingly, when the above-mentioned sum of a and b is made 100 ppm by weight or more and b/a is set within a range of 0.25 to 25, it is now possible to prepare a quartz glass material which does not generate damages such as solarization, compaction and rarefaction against the laser irradiation under broad conditions from low-energy density to high-energy density.

When a predetermined amount of fluorine is contained, one must pay attention particularly in the case of quartz materials for optical use for lowering of absolute refractive index and for worsening of homogeneity of refractive index When fluorine is contained in large quantities, absolute refractive index of quartz glass greatly lowers. When distribution of fluorine concentration is present in quartz glass material, that greatly affects the homogeneity of the refractive index as well. Therefore, it is preferred that the optimum fluorine concentration is set at 30 ppm by weight to 1,000 ppm by weight or, more preferably, at 30 ppm by weight to 200 ppm by weight That is because, when it is less than 30 ppm by weight, no effect is achieved in enhancing the laser resistance while, when it is more than 1,000 ppm by weight there are bad affections that changes in refractive index which are not negligible as quartz glass material for exposing machines are resulted and that flatness of fluorine concentration distribution becomes difficult whereby high homogeneity is hardly available.

Since fluorine is a kind of halogen and has an effect of a dehydrating agent as well, when a porous mother material is subjected to a fluorine-containing thermal treatment, that also affects the amount of SiOH. Generally speaking, when fluorine concentration in the resulting quartz glass becomes high, dehydration of SiOH proceeds and the SiOH concentration in the resulting quartz glass is apt to become low. With regard to the amounts of SiOH and fluorine, there are many varying factors such as temperature at the atmosphere treatment, concentration of fluorine-containing gas, density and size of the porous mother material, etc. Accordingly, with regard to the optimum amounts of SiOH and fluorine, an optimum condition is to be set by means of experiments.

In order to use as an optical material for actual ArF exposure apparatus, there is a need that not only a laser resistance is excellent but also general optical characteristics such as transmissivity, homogeneity and double refraction are available in high levels. To be more specific, it is preferred that internal transmissivity per cm of the thickness of quartz glass at 193.4 nm is 99.75% or more, homogeneity of refractive index at 632.8 nm is $2 \times 10^{-8}$ or less and double refraction is 0.5 nm/cm or less.

A material which satisfies both of the above-mentioned optical characteristics and the laser resistance such as solarization, compaction, rarefaction and photorefractive effect is able to be appropriately used as an optical quartz material for an ArF exposure apparatus.

The optical synthetic quartz glass material of the present invention as such can be manufactured by a method containing the following steps a) to f).

a) a step where a volatile silicon compound is hydrolyzed by oxyhydrogen flame and the resulting fine particles of silica are sedimented on a heat-resistant substrate to prepare a porous mother material;

b) a step where the porous mother material is allowed to stand in an atmosphere containing a fluorine compound so that fluorine is contained in the porous mother material;

c) a step where the porous mother material is kept at 1673 K or higher in vacuo or in an inert gas-containing atmosphere to prepare a transparent quartz glass;

d) a step where the transparent quartz glass is hated at the temperature of a softening point at the lowest and external force is applied to deform whereupon cords are removed;

e) a step where the quartz glass wherefrom the cords are removed is once kept at the temperature which is an annealing point or higher and, after that, subjected to a slow cooling whereupon a virtual temperature is set at 1073 K to 1323 K; and f) a step where the quartz glass in which the virtual temperature is set at 1073 K to 1323K is subjected to a thermal treatment at the temperature of 523 K to 773 K in a hydrogen gas-containing atmosphere so that hydrogen molecules are contained therein.

With regard to the volatile silicon compound in the step a), a chlorine-type silicon compounds such as $SiCl_4$ and $SiHCl_3$ and organic silicon compounds such as methyl trimethoxysilane $[C_4H_{12}O_3Si]$, tetramethoxysilane $[C_4H_{12}O_4Si]$, hexamethyl disiloxysilane $[C_6H_{18}OSi_2]$, hexamethyl disilazane $[C_6H_{19}NSi_2]$ and octamethyl cyclotetrasiloxane $[C_8H_{24}O_4Si_4]$ may be used specifically. Such a volatile silicon compound is introduced into the flame of oxygen and hydrogen and the resulting fine particles of silica are sedimented on a heat-resisting substrate to give a porous mother material (soot material) [step a)]. With regard to a synthetic method for obtaining the porous mother material at that time, there are growing methods which are generally called a VAD method and an OVD method although there is no particular choice for the synthetic means.

When the resulting porous mother material is exposed for a certain period in an atmosphere containing fluorine gas, fluorine-containing gas is diffused in the porous mother material [step b)]. Although the temperature at that time may be ambient temperature, it is possible that fluorine is doped within short time if an appropriate heating is carried out Atmosphere concentration of the fluorine compound gas can be adjusted by mixing with inert gas. Temperature and time for the treatment, concentration of the atmospheric gas, etc. can be appropriately adjusted depending upon the object that how much fluorine and SiOH are to be remained in the finally-prepared transparent glass.

After that, the resulting porous mother material is placed in an electric furnace and heated to give a transparent quartz glass [step c)]. In general, a transparent glass is achieved in vacuo or in an atmosphere of inert gas such as He. With regard to the temperature at that time, temperature of about 1673 K or higher is necessary.

The resulting transparent quartz glass contains fluorine and SiOH but it is frequent that their concentrations are not homogeneous and a homogenizing treatment is carried out thereafter [step d)]. Thus, the transparent quartz glass having a distribution is heated and kept at the softening point or higher and kneaded using an external force whereby a homogeneous mixing takes place and homogeneity of the above-mentioned fluorine and SiOH is achieved. With regard to a heating source at that time, an electric heater, an oxygen-hydrogen flame having a high burning temperature or the like is used.

The quartz glass where a homogeneous concentration distribution is achieved is made into a desired shape and, in order to further improve the homogeneity, it is once kept at the temperature above an annealing point and then annealed [step e)]. Usually, it is once heated up to around 1473 K and then cooled at a cooling rate of 10 K/hour or slower to give a material having a high homogeneity although, with regard to the condition for the thermal treatment, some fine adjustments are carried out depending upon the shape and the size of the quartz glass to be treated and the optimum condition may be applied.

It is preferred that the fictive temperature of the quartz glass obtained after the anneal treatment is set at 1323 K or lower. A fictive temperature is the temperature where the structure is frozen upon cooling and, when the fictive temperature is high, characteristics concerning laser resistance, particularly concerning solarization, are deteriorated. When distribution of the fictive temperature is big, that badly affects the homogeneity and the double refraction as well. The lower the fictive temperature, the higher the stability as the structure of the glass but, in order to set at substantially too low temperature, an anneal treatment for long time is necessary and, practically, the product can be appropriately used as a quartz material for an ArF exposing machine when the fictive temperature is set at 1073 K to 1323 K.

After that, a predetermined amount of hydrogen molecule is doped to the quartz glass where the fictive temperature is set at not higher than 1323 K [step f)]. With regard to the doping of hydrogen molecule, a thermal treatment is carried out within a temperature range of 523 K to 773K in an atmosphere containing hydrogen gas whereupon hydrogen molecules are diffused from the surface of the quartz glass to its inner area and are contained therein. When the temperature is higher than 773 K, there is resulted a reducing deficiency whereby solarization is resulted in the quartz glass whereby laser irradiation characteristic is deteriorated or, in some cases, deterioration of the initial transmissivity is resulted due to pollution by the thermal treatment When the temperature is too low, diffusion of hydrogen is slow whereby the productivity lowers. With regard to the setting of the treating temperature, the optimum value is decided taking both of the produced amount of the above-mentioned reducing deficiency and the productivity into consideration. Thickness (size) of the quartz glass to be treated is also important That is because, in the case of the glass where the size is small, time until hydrogen is diffused to entire glass is short and, even when the temperature is set relatively low, that rarely affects the productivity. On the contrary, in the case of a product having a big size, the productivity is extremely deteriorated unless the temperature is set relatively higher. Substantially, it is preferred to set at the temperature range of 523 K to 773 K. It is preferred that the amount of hydrogen to be contained therein is set within a range of $1 \times 10^{16}$ to $1 \times 10^{18}$ molecules/$cm^3$. Control of hydrogen amount is possible if the treating conditions such as pressure and mixing ratio of the hydrogen-containing gas are adjusted. For example, when a treatment is carried out for long time at the temperature of about 673 K in an atmosphere of 100% hydrogen gas of an absolute pressure of 0.1 MPa, about $5 \times 10^{17}$ hydrogen molecules are able to be contained.

The synthetic quartz glass material manufactured by the above-mentioned method has excellent general optical characteristics such as high homogeneity of refractive index, low double refractive index and high transmission property, has a high laser resistance where the optical characteristics are stable even by an ArF excimer laser irradiation for a long period and is able to be appropriately used as a quartz glass material for an exposure machine for ArF excimer laser.

EXAMPLES

As hereunder, working examples of the present invention will be specifically illustrated and i goes without saying that those examples are given for exemplification and that they are not to be understood in a limitative manner.

Measured values used in the following Examples and Comparative Examples are in accordance with the following measuring methods.

i) Evaluation of laser resistance Synthetic quartz glass material is irradiated with 0.3 mJ/cm$^2$p and 10 mJ/cm$^2$p of energy densities and the shape of transmitted wave surface at 632.8 nm is measured every certain irradiation dose. Incidentally, measurement of the transmitted wave surface is conducted by a Fizeau's interferometer (Zygo Mark IV).

Figure 1:
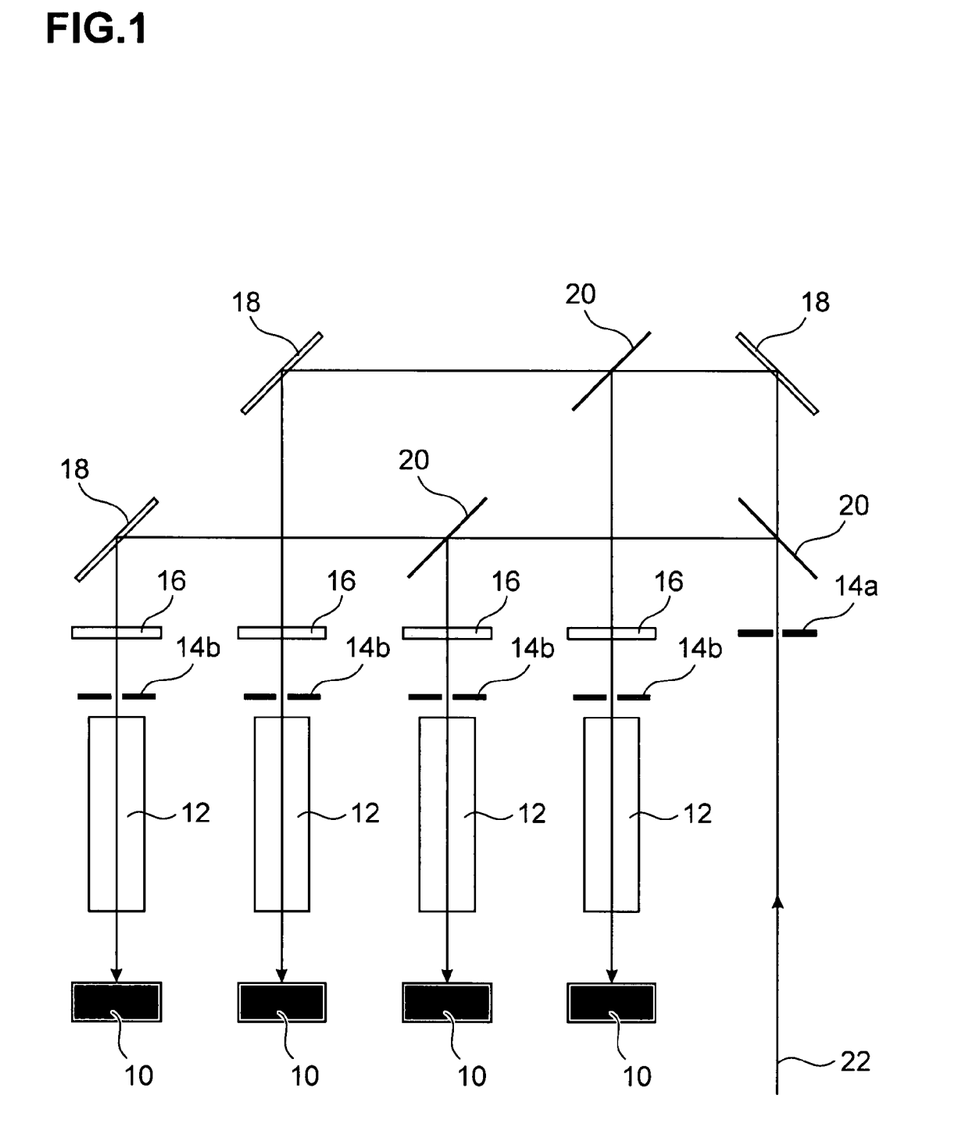
FIG. 1 shows a schematically diagram for illustrating an apparatus for use in ArF excimer laser irradiation test

FIG. 1 shows an outline of apparatus for an ArF excimer laser irradiation. Excimer laser beam 22 where energy is adjusted passes through a first aperture 14a and divided into a plurality of beams via several total reflectors 18 and beam splitters 20. Each beam is converted to circulatory polarized light through a ¼ λ plate 16 and irradiated to each sample 12 via a secondary aperture 14b. The excimer laser beam passing through the sample 12 is subjected to its measurement for energy density by a laser energy meter 10.

All irradiation experiments are carried out in a nitrogen atmosphere. After each predetermined irradiation, the sample is taken out and shape of the transmitted wave surface is measured using a Zygo Mark IV interferometer.

Figure 2:
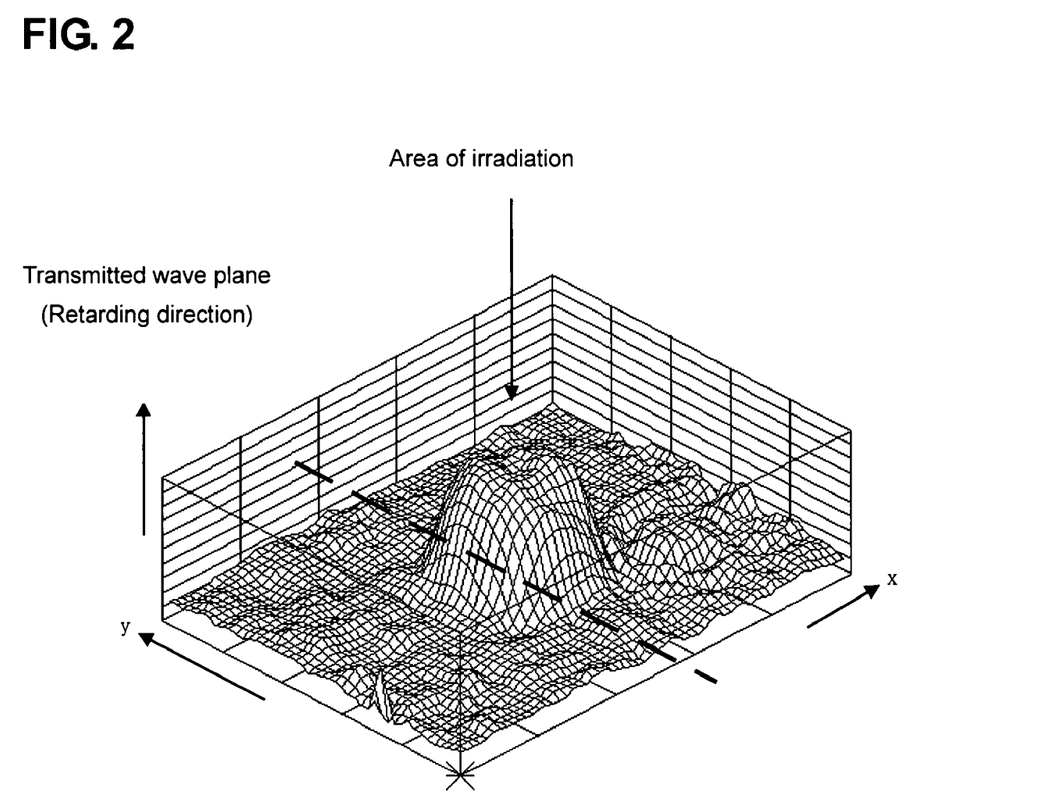
FIG. 2 is a 3D map of the transmitted wave plane and a graph showing the method for calculating the change in wave plane.

FIG. 2 shows an example of shape of wave surface of the sample in terms of a 3D map where the transmitted wave surface is delayed due to compaction. In FIG. 2, a rising part in convex at the central area is a part where laser is irradiated and it is noted that, due to compaction, the transmitted wave surface changes in the direction of being delayed. As shown by dots in FIG. 2, a one-dimensional wave surface distribution is drawn passing the center of the irradiated area and a PV (peak to valley) value of the transmitted wave surface is calculated as the changed amount of the wave surface.

ii) Cords They are observed by naked eye using a polarized plate of cross nicol.

iii) Homogeneity of refractive index Evaluated by measurement of difference in refractive indexes at a He—Ne laser wavelength (632.8 nm). A synthetic quartz glass material before irradiation of laser is measured by a Fizeau's interferometer (Zygo Mark IV).

iv) Measurement of hydrogen molecule concentration Measured by a laser Raman scattering spectroscopic method (see: V. S. Khotimchenko et al., Jour. Appl. Spectrosc. (1987) p. 632-635). In this method, hydrogen molecule concentration in synthetic quartz glass is determined from the ratio of intensity of Raman band of wavelength 800 cm$^{-1}$ concerning SiO$_2$ to intensity of 4135 cm$^{-1}$ concerning hydrogen molecules contained in the synthetic quartz glass and the concentration C of hydrogen molecule is calculated by the following formula (1).

$$C = k \times I(4135)/I(800) \tag{1}$$

(In the formula (1), I(4135) is a surface intensity of Raman band of 4135 cm$^{-1}$; I(800) is a surface intensity of Raman band of 800 cm$^{-1}$; and k is a constant and is $1.22\times10^{21}$.

Concentration of hydrogen molecules calculated by the above formula (1) is shown by the numbers of hydrogen molecules per 1 cm$^3$ volume. The measuring instrument used for the measurement of hydrogen molecule concentration by a Raman scattering method in the Examples is a Raman scattering spectroscope NR-1100 of a double monochromatic type manufactured by Nippon Bunko K K, the detector used is a photoelectric amplifier R943-02 manufactured by Hamamatsu Photonics K K and the laser beam used for the measurement is Ar ion laser (488 nm).

v) Double refraction Measured by HINDS Exicor 350 AT, an automatic measuring apparatus for double refraction.

vi) Initial transmissivity at 193.4 nm Measured by Varian Cary 4E, a visible/ultraviolet spectrophotometer. Measured using a sample where the thickness is 10 mm and both sides are polished. The theoretical transmissivity of quartz glass at 193.4 nm which is 90.86% (a value where loss by a multiple reflection of the surface is deducted from 100%) is used and is calculated from a formula (T/90.68)×100 where T (%) is an apparent transmissivity at 10 mm thickness.

vii) Measurement of SiOH group Calculated from the intensity of O—H starching vibration bands of 2.7 microns using an infrared absorption spectrophotometer (IR-700 manufactured by Nippon Bunko).

viii) Measurement of fluorine content Quantified using a fluorine ion electrode.

ix) Measurement of fictive temperature Measured by a laser Raman scattering spectroscopic method. Quantified from the intensity of D1 and D2 Raman scattering bands of quartz glass. A calibration is prepared from quartz glass sample where a fictive temperature is set compulsorily by means of quenching and a fictive temperature is calculated from the measured value of actual sample.

Example 1

Silicon tetrachloride was subjected to a distillation treatment to remove impurities and was used as a material to prepare a porous quartz glass mother material in a column of 300 mm outer diameter and 1200 mm length by a CVD method [step a)].

The porous quartz glass mother material was subjected to a thermal treatment for 6 hours at 1173 K in He gas containing 0.01% by volume of SiF$_4$ and, after that, subjected to a thermal treatment for 8 hours using He gas containing 20% by volume of oxygen keeping the above temperature [step b)]. After cooling, the porous quartz glass mother material was placed in a vacuum furnace equipped with a carbon heater and heated up to 1853 K under a vacuum condition of 2.5 Pa to give a transparent glass [step c)]. The resulting transparent quartz glass was a transparent quartz glass in a column having 180 mm outer diameter and 800 mm length.

Both ends of the resulting transparent quartz glass were fused to a support rod made of quartz glass and caught by a chuck of a lathe for processing a quartz glass and a synthetic quartz glass ingot was rotated. The rotating ingot was topically heated by a burner and slowly elongated together with formation of a fused zone to mold into quartz glass having 120 mm diameter. After that, a topical heating was continuously carried out by a burner once again and rotating direction and rotating numbers of the chuck were independently varied together with formation of fused zone whereupon stress is generated in the fused zone and removal of cords and homogenization of the ingot were attempted [step d)].

After that, the gap between chucks of the lathe for processing the quartz glass was made narrow, the synthetic glass ingot was compressed to deform into a balk shaped synthetic quartz glass, the ball-shaped synthetic quartz glass was cut out, the synthetic quartz glass ingot was attached to a support rod of a support stand where the cut-out surfaces were made upper and lower sides and heated to soften using a burner together with rotation whereupon it was homogenized once again to give a rod-shaped synthetic quartz glass ingot In the resulting ingot, neither cord nor layered structure was noted in three directions.

In order to mold the above-mentioned synthetic quartz glass ingot into a desired shape, the ingot was placed in a graphite crucible where ash of Na was not more than 20 ppm by weight the inner space of the crucible was substituted with a nitrogen atmosphere, temperature in the furnace was made 2173 K and kept at that temperature for 10 minutes to mold. Size of the resulting quartz glass was 400 mm outer diameter and 100 mm thickness.

Since surface of the quartz glass directly contacted the graphite crucible during the molding step, there was a risk of contamination of metal impurities especially near the surface and, therefore, before the next thermal treatment, the surface was cut and removed to an extent of 10 mm from all sides of upper and lower sides and surrounding parts whereupon a quartz glass of 380 mm diameter and 80 mm thickness was prepared.

After that, the quartz glass was placed in an electric furnace where alumina having not lower than 99% of purity was a furnace material, kept at 1423 K for 50 hours, gradually cooled down to 1210 K at a cooling rate of 0.2 K/hour and then subjected to a natural cooling to conduct an operation of removal of strain [step e)]. When the fictive temperature after the thermal treatment was measured, it was 1220 K at the end.

For the purpose that hydrogen is contained in the resulting quartz glass, each 12.5 mm of upper and lower sides were cut to give a quartz glass of 380 mm diameter and 55 mm thickness. The quartz glass was allowed to stand for 1500 hours at 673 K in a 100% hydrogen gas atmosphere of 0.15 MPa pressure so that hydrogen molecules are contained therein [step f)]. In such a state as it was, hydrogen molecules existed in high concentrations near the surfaces of the quartz glass and, therefore, the atmosphere was substituted with nitrogen after the treatment with hydrogen-containing atmosphere and the glass was allowed to stand at 673 K for 400 hours so that hydrogen near the surfaces was degassed and distribution of the hydrogen molecule concentration in the quartz glass was made uniform whereupon a synthetic quartz glass material was prepared.

When hydrogen concentration at the central part of the synthetic quartz glass material was measured by a Raman spectrum measuring apparatus, it was about $5 \times 10^{17}$ (molecules/cm$^3$). As a result of analysis of impurities, all of concentrations of metal impurities such as Na, Li, K Fe, Cu, Al and Ti were not more than 5 ppb.

From the place near the area where the impurity analysis of the synthetic quartz glass material was conducted as above, a test piece of 60 mm diameter and 10 mm thickness was cut out an optical polishing was conducted for both sides (encountering side) and the internal transmissivity of wavelength of 193.4 nm was measured by a visible/ultraviolet spectrophotometer and found to be 99.75% whereupon a good initial transmissivity was resulted.

Further, SiOH concentration and fluorine concentration of the synthetic quartz glass material were measured and the average concentrations were about 300 ppm by weight and 200 ppm by weight, respectively. The existing ratio (B/A) of fluorine to SiOH was 0.67 and both were contained in a well-balanced manner.

When homogeneity of refractive index and double refraction of the synthetic quartz glass material were tested, difference ($\Delta n$) between maximum and minimum values of refractive index at 632.8 nm which was a region where the diameter in the surface crossing in right angle to the optical axis was 280 mm or more was $1.0 \times 10^{-6}$ and double refraction was 0.3 nm/cm.

Figure 4:
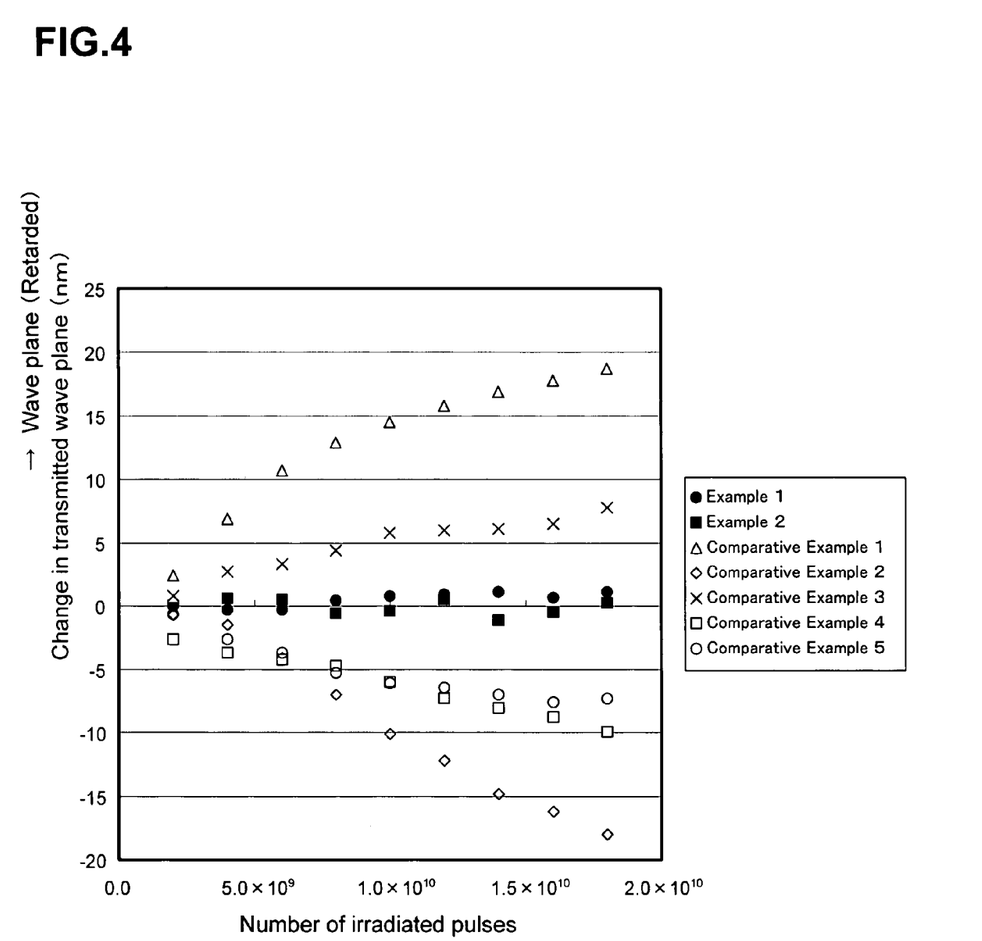
FIG. 4 is a graph showing change in transmitted wave plane with changing times (change with passage of time) of irradiating ArF excimer laser at an energy density per pulse of 0.3 mJ/cm$^2$ on the members obtained in Examples 1 and 2 and in Comparative Examples 1 to 5.

A test piece for evaluation of laser resistance was cut out from the above-prepared synthetic quartz glass material and subjected to an optical polishing on whole surfaces of the square column of 30×30×100 mm. An ArF excimer laser of 2 KHz frequency number was irradiated to the test piece in its longitudinal direction using circular beam of energy density of 0.3 mJ/cm$^2$p up to an extent of $1.8 \times 10^{10}$ pulses. After each of a predetermined irradiation, the sample was taken out and transmitted wave surface in the longitudinal direction was measured at 632.8 nm using a Fizeau interferometer (Zygo Mark IV). FIG. 4 shows the result of changed values of transmitted wave surface which were measured every $2 \times 10^9$ pulses.

Figure 3:
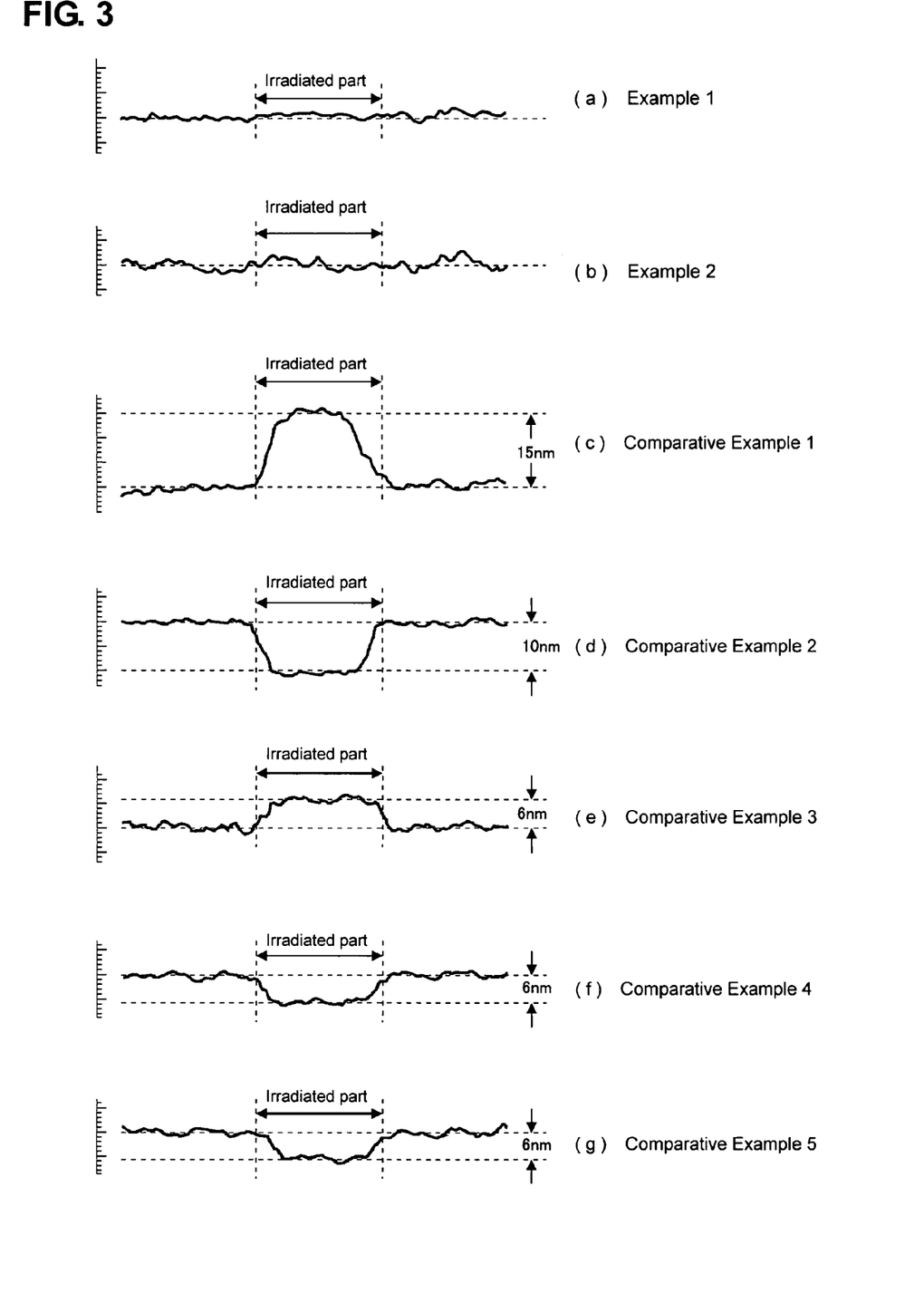
FIG. 3 is a graph showing change in transmitted wave plane after irradiating ArF excimer laser at $1\times10^{10}$ pulses at an energy density per pulse of 0.3 mJ/cm$^2$ on the members obtained in Examples 1 and 2 and in Comparative Examples 1 to 5.

FIG. 3(*a*) shows the measured values of transmitted wave surface (TWS) on a line passing the center of irradiated area in an irradiated sample after irradiation of $1 \times 10^{10}$ pulses in Example 1 and a + direction of a Y axis in the drawing means a direction where the transmitted wave surface delayed or, in other words, a direction of changes when a density increase (compaction) of the irradiated area was resulted. It is noted from FIG. 3(*a*) that, especially even after irradiation of $1 \times 10^{10}$ pulses, no significant change in the transmitted wave surface is noted. Transmissivity at 193.4 nm was measured after a laser irradiation was measured but there was no substantial change. It is also noted from FIG. 4 that, even in the case of more than $1 \times 10^{10}$ pulses, no change is noted in the transmitted wave surface.

Similarly, another test piece cut out from the above-prepared synthetic quartz glass material was irradiated with $1 \times 10^7$ pulses of ArF laser of energy density of 10 mJ/cm$^2$p, changes in the transmitted wave surface were measured and changes in refractive index of the quartz glass were calculated. The irradiated area shrank with a change in density (compaction) and, as compared with the non-irradiated area, the transmitted wave surface per 1 cm of the thickness delayed about 4.0 nm but the change was within an allowable range.

Result of physical properties obtained hereinabove in Example 1 is shown in Table 1.

TABLE 1

|  | Ex 1 | Ex 2 | CEx 1 | CEx 2 | CEx 3 | CEx 4 | CEx 5 |
|---|---|---|---|---|---|---|---|
| SiOH Concn.(wt ppm) | 300 | 200 | 300 | 900 | 6 | 300 | 400 |
| $H_2$ Concn.(molecules/$cm^3$) | $5 \times 10^{17}$ | $3 \times 10^{16}$ | <DL | $5 \times 10^{17}$ | $5 \times 10^{17}$ | $3 \times 10^{18}$ | $1 \times 10^{18}$ |
| Fluorine Concn. (wt ppm) | 200 | 400 | 200 | <DL | 800 | 200 | 50 |
| Cord | none | none | none | none | none | none | none |
| B/A | 0.67 | 2 | 0.67 | 0 | 133 | 0.67 | 0.075 |
| Fictive Temperature (K) | 1220 | 1200 | 1230 | 1200 | 1200 | 1220 | 1230 |
| Homogeneity of refractive index ($\Delta n$) | $1.0 \times 10^{-6}$ | $1.3 \times 10^{6}$ | $1.0 \times 10^{-6}$ | $1.5 \times 10^{-6}$ | $2.0 \times 10^{-6}$ | $1.2 \times 10^{-6}$ | $1.5 \times 10^{-6}$ |
| Double refraction (nm/cm) | 0.3 | 0.2 | 0.3 | 0.4 | 0.25 | 0.3 | 0.4 |
| Initial Transmissivity (%) | 99.75 | 99.77 | 99.75 | 99.75 | 99.77 | 99.75 | 99.75 |
| ArF Resist. (Changes in TWS upon irradiation of 10 mJ/$cm^2$p) | 4.0 nm | 3.5 nm | 6.3 nm | 4.5 nm | 3.6 nm | 3.5 nm | 5.7 nm |
| ArF Resistance (Changes in TWS upon irradiation of 0.3 mJ/$cm^2$p) | <0.1 nm | <0.1 nm | 1.5 nm | −1.0 nm | 0.6 nm | −0.6 nm | −0.6 nm |
| Observed Damage | NC | NC | Comp | Rare | Comp | Rare | Rare |

CEx: Comparative Example
DL: Detection limit
TWS: Transmitted wave surface
NC: No change
Comp: Compaction
Rare: Rarefaction As mentioned above, the synthetic quartz glass material prepared in Example 1 is stable against irradiation of low energy density for a long period which is near the irradiation condition being used in actual semiconductor exposing apparatus, has excellent resistances to laser damages such as solarization, compaction and rarefaction, has characteristics such as high homogeneity and low double refraction necessary for optical glass and has a very good initial transmissivity in the ultraviolet region whereby it is a synthetic quartz glass material in a big size which is able to be appropriately used as a lens material for excimer laser exposing apparatus for the manufacture of semiconductors.

Example 2

A porous quartz glass mother material in a column of 300 mm outer diameter and 1200 mm length was prepared by the same method as in the step a) of Example 1 except that a highly pure tetramethoxysilane was used as a material.

The porous quartz glass mother material was subjected to a thermal treatment for 4 hours at 1273 K in He gas containing 0.02% by volume of $SiF_4$ and then subjected to a thermal treatment for 8 hours with He gas containing 20% by volume of oxygen keeping the above temperature [step b)]. With regard to the treatments after that the step c) to the step e) were carried out under the entirely same condition as in Example 1 to give quartz glass in the same size as Example 1.

In the final step f), a treating condition was somewhat modified so as to set the hydrogen concentration lower than in the case of Example 1. The quartz glass was allowed to stand for 1500 hours at 673 K in nitrogen containing 10% by volume of hydrogen gas of 0.01 MPa pressure so that hydrogen molecules were contained therein. After that, the atmosphere was substituted with 100% by volume of nitrogen, the glass was allowed to stand for 400 hours at 673K so that distribution of the hydrogen molecule concentration in the quartz glass was made uniform to give a synthetic quartz glass material. Physical properties, optical characteristics and laser resistances of the resulting synthetic quartz glass material were measured by the same manner as in Example 1. Details of the measurement are as follows. The result is shown in Table 1, FIG. 3(b) and FIG. 4.

When the hydrogen concentration of central part of the synthetic glass material was measured by a Raman spectrum measuring apparatus, it was about $3 \times 10^{16}$ molecules/$cm^3$. As a result of the analysis of impurities, concentrations of all of metal impurities such as Na, Li, K, Fe, Cu, Al and Ti were not more than 5 ppb. When the internal transmissivity of wavelength 193.4 nm was measured, it was 99.77% showing a good initial transmissivity.

SiOH concentration and fluorine concentration were about 200 ppm by weight and 400 ppm by weight, respectively. The existing ratio (b/a) of fluorine to SiOH was 2.0 and both were contained in a well-balanced manner. When homogeneity of refractive index and double refraction were tested, difference ($\Delta n$) between maximum and minimum values of refractive index at 632.8 nm which was a region where the diameter in the surface crossing in right angle to the optical axis was 280 mm or more was $1.3 \times 10^{-6}$ and double refraction was 0.2 nm/cm.

Irradiation test of ArF laser with a low energy density was carried out as same as in Example 1. Changes in the transmitted wave surface after irradiation of $1 \times 10^{10}$ pulses are shown in FIG. 3(b) and, even after irradiation of $1 \times 10^{10}$ pulses, no particularly significant change in transmitted wave surface was noted. FIG. 4 shows the result of changes in the transmitted wave surface measured every $2 \times 10^9$ pulses. It is noted that there is no change in the transmitted wave surface even in the case of more than $1 \times 10^{10}$ pulses. Transmissivity of 193.4 nm after laser irradiation also did not change substantially.

At the same time, another test piece which was cut out from the resulting synthetic quartz glass material was irradiated with $1 \times 10^7$ pulses of ArF laser having an energy density of 10 mJ/$cm^2$p, changes in the transmitted wave surface were measured and changes in the refractive index of the quartz glass were calculated. The irradiated area shrank with a change of density (compaction) as same as in the case of Example 1 and, as compared with the non-irradiated area, the transmitted wave surface per cm thickness delayed to an extent of about 3.5 nm although the change was within an allowable range.

The synthetic quartz glass material obtained in Example 2 is a synthetic quartz glass having both good optical characteristics and laser resistances and is a synthetic quartz glass material in a big size which is able to be appropriately used as a lens material for an excimer laser exposure apparatus for the manufacture of semiconductors.

Comparative Example 1

A synthetic quartz glass material was prepared by the entirely same method as in Example 1 except that a step f) of hydrogen treatment was not applied and physical properties, optical characteristics and laser resistances were measured by the same manner as in Example 1. Details of the measurement are as follows. The result is shown in Table 1, FIG. 3(c) and FIG. 4.

Hydrogen concentration of central part of the synthetic quartz glass material was measured by a Raman spectrum measuring apparatus and found to be not more than the detection limit ($<1\times10^{15}$). As a result of the analysis of impurities, all concentrations of metal impurities such as Na, Li, K, Fe, Cu, Al and Ti were not more than 5 ppb. When the internal transmissivity of the wavelength 193.4 nm was measured, it was 99.75% showing a good initial transmissivity.

SiOH concentration and fluorine concentration were about 300 ppm by weight and 200 ppm by weight, respectively. The existing ratio (b/a) of fluorine to SiOH was 0.67 and both were contained in a well-balanced manner. When homogeneity of refractive index and double refraction were tested, difference (Δn) between maximum and minimum values of refractive index at 632.8 nm which was a region where the diameter in the surface crossing in right angle to the optical axis was 280 mm or more was $1.0\times10^{-6}$ and double refraction was 0.3 nm/cm.

When an ArF laser irradiation test was conducted with a low energy density as same as in Example 1, a delay in the transmitted wave surface was observed at the irradiated area. FIG. 3(c) shows the transmitted wave surface after irradiation of $1\times10^{10}$ pulses. In addition, a big double refraction was observed at the boundary region between irradiated and non-irradiated areas. Damage by compaction of the irradiated area was clearly observed. As compared with the non-irradiate area, the transmitted wave surface of the irradiated area delayed to an extent of about 1.5 nm per 1 cm thickness. It means that compaction took place by irradiation whereby refractive index rose to an extent of about $150\times10^{-9}$ and that a big strain was resulted by compaction at the boundary surface. FIG. 4 shows the result of changes of transmitted wave surface measured every $2\times10^9$ pulses. It is noted that the transmitted wave surface changes further in the direction of compaction exceeding $1\times10^{10}$ pulses.

On the other hand, another test piece cut out from the resulting synthetic quartz glass material was irradiated with $1\times10^7$ pulses of ArF laser with an energy density of 10 mJ/cm$^2$p and changes in the transmitted wave surface were measured. The result was that, as same as in Example 1, the irradiated area shrank together with a density change and, as compared with the non-irradiated area, the transmitted wave surface delayed to an extent of about 6.3 nm per 1 cm thickness. Thus, as compared with Examples 1 and 2, damage by considerably big compaction was resulted.

As such, damage by compaction was resulted under the irradiation of any of conditions of lower energy density and high energy density and, therefore, when such a synthetic quartz glass material is used for an exposure apparatus for the manufacture of semiconductors, that is believed to cause a big influence on the imaging characteristic.

Comparative Example 2

After impurities were removed by subjecting tetramethoxysilane to distillation, the product was used as a material and transparent glass in a column having 180 mm outer diameter and 800 mm length was prepared by a direct flame hydrolysis method. A direct flame hydrolysis method is a method where a silicon compound is introduced into an oxygen-hydrogen flame, the resulting fine particles of silica are sedimented on a heat-resistant target and, at the same time, fused on a surface kept at high temperature by an oxygen-hydrogen flame from a burner whereupon a transparent synthetic quartz glass is directly prepared. In the case of Example 1, fine particles of silica are sedimented and the resulting porous mother material is again fused in an electric furnace to give transparent glass and that manufacturing method is somewhat different. The transparent glass ingot prepared by a direct flame hydrolysis method contained about $3\times10^{18}$ molecules/cm$^3$ of hydrogen molecule because hydrogen molecules in the oxygen-hydrogen flame were dissolved during the synthesis.

As same as in the case of Example 1, the quartz glass ingot was subjected to the steps d) and e) to give a synthetic quartz glass material having 380 mm diameter and 80 mm thickness. Physical properties, optical characteristics and laser resistances of the resulting synthetic quartz glass material were measured by the same manner as in Example 1. Details of the measurement are as follows. The result is shown in Table 1, FIG. 3(d) and FIG. 4.

When hydrogen concentration at the central part of the synthetic quartz glass material was measured by a Raman spectrum measuring apparatus, it was about $5\times10^{17}$ molecules/cm$^3$. That is because, since a lot of hydrogen was contained in the ingot synthesized by a direct flame hydrolysis method, although considerable amount of hydrogen molecules were degassed by annealing, sufficient amount of hydrogen molecules still remained there.

As a result of analysis of impurities, all concentrations of metal impurities such as Na, Li, K Fe, Cu, Al and Ti were not more than 5 ppb. When the internal transmissivity of wavelength 193.4 nm was measured, it was 99.75% showing a good initial transmissivity.

SiOH concentration was 900 ppm by weight and no fluorine was detected. When homogeneity of refractive index and double refraction were tested, difference (Δn) between maximum and minimum values of refractive index at 632.8 nm which was a region where the diameter in the surface crossing in right angle to the optical axis was 280 mm or more was $1.5\times10^{-6}$ and double refraction was 0.4 nm/cm.

When an ArF laser irradiation test was conducted with a low energy density as same as in Example 1, a progress in the transmitted wave surface was observed at the irradiated area. FIG. 3(d) shows the transmitted wave surface after irradiation of $1\times10^{10}$ pulses and it is confirmed that damage by rarefaction or by photorefractive effect of the irradiated area was resulted and wave surface proceeded. As compared with the non-irradiated area, the transmitted wave surface of the irradiated part progressed to an extent of about 1.0 nm per 1 cm thickness. It means that, if the refractive index was assumed to change, refractive index lowered to an extent of about $100\times10^{-9}$. FIG. 4 shows the result of changes of transmitted wave surface measured every $2\times10^9$ pulses. It is noted that the transmitted wave surface changes further in the direction of rarefaction exceeding $1\times10^{10}$ pulses.

On the other hand, another test piece cut out from the resulting synthetic quartz glass material was irradiated with $1\times10^7$ pulses of ArF laser with an energy density of 10 mJ/cm$^2$p and changes in the transmitted wave surface were measured. The result was that, as same as in Example 1, the irradiated area shrank together with a density change and, as compared with the non-irradiated area, the transmitted wave surface delayed to an extent of about 4.5 nm per 1 cm thickness. That is a level without particular problem.

However, in irradiation with a low energy density, damage of shortening the optical path length was resulted and, therefore, when such a quartz glass is used for an exposure apparatus for the manufacture of semiconductors, that will cause a big influence on an imaging characteristic.

Comparative Example 3

A synthetic quartz glass material was prepared by the entirely same method as in Example 1 except that the treating condition for the step b) where fluorine was contained in the porous mother material was changed. Thus, the step b) was carried out in such a manner that a thermal treatment was conducted for 8 hours at 1273 K in He gas containing 0.05% by volume of SiF$_4$ and then subjected to a thermal treatment for 8 hours with He gas containing 10% by volume of oxygen keeping the temperature same. Physical properties, optical characteristics and laser resistances of the resulting synthetic quartz glass material were measured by the same manner as in Example 1. Details of the measurement are as follows. The result is shown in Table 1, FIG. 3(e) and FIG. 4.

When hydrogen concentration at the central part of the synthetic quartz glass material was measured by a Raman spectrum measuring apparatus, it was about $5\times10^{17}$ (molecules/cm$^3$). As a result of analysis of impurities, all concentrations of metal impurities such as Na, Li, K, Fe, Cu, Al and Ti were not more than 5 ppb. When the internal transmissivity of wavelength 193.4 nm was measured, it was 99.77% showing a good initial transmissivity.

SiOH concentration and fluorine concentration were about 6 ppm by weight and 800 ppm by weight, respectively. The existing ratio (b/a) of fluorine to SiOH was 133 and, in terms of balance, fluorine was noted to be contained considerably excessively. When homogeneity of refractive index and double refraction were tested, difference ($\Delta$n) between maximum and minimum values of refractive index at 632.8 nm which was a region where the diameter in the surface crossing in right angle to the optical axis was 280 mm or more was $2.0\times10^{-6}$ and double refraction was 0.25 nm/cm.

When an ArF laser irradiation test was conducted with a low energy density as same as in Example 1, a delay in the transmitted wave surface was observed at the irradiated area. FIG. 3(e) shows the transmitted wave surface after irradiation of $1\times10^{10}$ pulses. In addition, a big double refraction was observed at the boundary region between irradiated and non-irradiated areas. Damage by compaction of the irradiated part was clearly observed. As compared with the non-irradiate area, the transmitted wave surface of the irradiated area delayed to an extent of about 0.6 nm per 1 cm thickness and it means that compaction took place by irradiation whereby refractive index rose to an extent of about $60\times10^{-9}$ and that a big strain was resulted by compaction at the boundary surface. FIG. 4 shows the result of changes of transmitted wave surface measured every $2\times10^9$ pulses. It is noted that the transmitted wave surface slowly changes further in the direction of compaction exceeding $1\times10^{10}$ pulses.

On the other hand, another test piece cut out from the resulting synthetic quartz glass material was irradiated with $1\times10^7$ pulses of ArF laser with an energy density of 10 mJ/cm$^2$p and changes in the transmitted wave surface were measured. The result was that, as same as in Example 1, the irradiated area shrank together with a density change and, as compared with the non-irradiated area, the transmitted wave surface delayed to an extent of about 3.6 nm per 1 cm thickness. Thus, as compared with Examples 1 and 2, damage by considerably big compaction was resulted.

As such, damage by compaction was resulted under the irradiation of any of conditions of lower energy density and high energy density and, therefore, when such a quartz glass is used for an exposure apparatus for the manufacture of semiconductors, that is believed to cause a big influence on the imaging characteristic.

Comparative Example 4

A synthetic quartz glass material was prepared by the entirely same method as in Example 1 except that condition for the hydrogen treatment step f) was changed. In the step f) where hydrogen is contained, the treating condition was changed so as to set the hydrogen concentration higher than in the case of Example 1. The quartz glass after the step e) was allowed to stand for 1500 hours at 673 K in a 100% by volume hydrogen gas atmosphere of 0.9 MPa pressure so that hydrogen molecules were contained therein. After that, the atmosphere was changed to 100% by volume of nitrogen and the glass was allowed to stand for 400 hours at 673° K whereby distribution of hydrogen molecule concentration in the quartz glass was made uniform. Physical properties, optical characteristics and laser resistances of the resulting synthetic quartz glass material were measured by the same manner as in Example 1. Details of the measurement are as follows. The result is shown in Table 1, FIG. 3(f) and FIG. 4.

When hydrogen concentration at the central part of the synthetic quartz glass material was measured by a Raman spectrum measuring apparatus, it was about $3\times10^{18}$ molecules/cm$^3$. As a result of analysis of impurities, all concentrations of metal impurities such as Na, Li, K Fe, Cu, Al and Ti were not more than 5 ppb. When the internal transmissivity of wavelength 193.4 nm was measured, it was 99.75% showing a good initial transmissivity.

SiOH concentration and fluorine concentration were about 300 ppm by weight and 200 ppm by weight, respectively. The existing ratio (B/A) of fluorine to SiOH was 0.67 and both were contained in a well-balanced manner. When homogeneity of refractive index and double refraction were tested, difference ($\Delta$n) between maximum and minimum values of refractive index at 632.8 nm which was a region where the diameter in the surface crossing in right angle to the optical axis was 280 mm or more was $1.2\times10^{-6}$ and double refraction was 0.3 nm/cm.

When an ArF laser irradiation test was conducted with a low energy density as same as in Example 1, although the changes in the transmitted wave surface were not so big as compared with Comparative Examples 1 and 2, a progress in the transmitted wave surface was observed at the irradiated area. FIG. 3(f) shows the transmitted wave surface after irradiation of $1\times10^{10}$ pulses and it was confirmed that, in the irradiated area, rarefaction or damage by photorefractive effect was clearly resulted whereby the wave surface proceeded. As compared with the non-irradiated area, the transmitted wave surface of the irradiated area proceeded to an extent of about 0.6 nm per 1 cm thickness and, when the refractive index was assumed to change, it means that refractive index lowered to an extent of about $60 \times 10^{-9}$. The glass of this Comparative Example 4 contains a lot of hydrogen molecules and that is believed to be one of the causes for resulting in rarefaction. FIG. 4 shows the result of changes of transmitted wave surface measured every $2 \times 10^9$ pulses. It is confirmed that, even above $1 \times 10^{10}$ pulses, damage proceeds in a direction of proceeding the transmitted wave surface although in a gradual manner.

On the other hand, another test piece cut out from the resulting synthetic quartz glass material was irradiated with $1 \times 10^7$ pulses of ArF laser with an energy density of 10 mJ/cm$^2$p and changes in the transmitted wave surface were measured. The result was that, as same as in Example 1, the irradiated area shrank together with a density change and, as compared with the non-irradiated area, the transmitted wave surface delayed to an extent of about 3.5 nm per 1 cm thickness and that is in a level of particularly no problem.

However, there was resulted a damage of shortening the optical path length by irradiation of lower energy density and, therefore, when such a quartz glass is used for an actual exposure apparatus for the manufacture of semiconductors, that is believed to cause a big influence on the imaging characteristic.

Comparative Example 5

A synthetic quartz glass material was prepared by the entirely same manner as in Example 1 except that the conditions for the step b) where fluorine is contained and the step f) where hydrogen treatment is conducted were changed. Thus, in the step b) where fluorine is contained, the treating condition was changed so as to set the fluorine concentration lower than the case of Example 1. The porous glass mother material prepared by the step a) was subjected to a thermal treatment for 4 hours at 1173 K in He gas containing 0.003% by volume of SiF$_4$ and, after that, a thermal treatment was conducted for 8 hours in He gas containing 20% by volume of oxygen keeping the above temperature. After that, the transparent quartz glass prepared by the steps c) to e) as same as in Example 1 was allowed to stand for 1500 hours at 673 K in an atmosphere of 100% by volume hydrogen gas of 0.3 MPa pressure in the step f) so that hydrogen molecules were contained therein. After that, the atmosphere was changed to 100% by volume of nitrogen and the glass was allowed to stand for 400 hours at 673 K so that distribution of the hydrogen molecule concentration in the quartz glass was made uniform to give a synthetic quartz glass material. Physical properties, optical characteristics and laser resistances of the resulting synthetic quartz glass were measured by the same manner as in Example 1. Details of the measurement are as follows. The result is shown in Table 1, FIG. 3(g) and FIG. 4.

When hydrogen concentration at the central part of the synthetic quartz glass material was measured by a Raman spectrum measuring apparatus, it was about $1 \times 10^{18}$ molecules/cm$^3$. The result of analysis of impurities was that all concentrations of metal impurities such as Na, Li, K, Fe, Cu, Al and Ti were not more than 5 ppb. When the internal transmissivity of wavelength 193.4 nm was measured, it was 99.75% showing a good initial transmissivity.

SiOH concentration and fluorine concentration were about 400 ppm by weight and 50 ppm by weight, respectively. Since the fluorine gas concentration in the treatment with fluorine in the step b) was low, dehydration reaction in the porous mother material did not proceed so much whereby, as a result a lot of SiOH remained as compared with the case of Example 1 and fluorine did not remain too much. The existing ratio (B/A) of fluorine to SiOH was 0.75 and, in terms of their balance, SiOH was excessive.

When homogeneity of refractive index and double refraction were tested, difference (Δn) between maximum and minimum values of refractive index at 632.8 nm which was a region where the diameter in the surface crossing in right angle to the optical axis was 280 mm or more was $1.5 \times 10^{-6}$ and double refraction was 0.4 nm/cm.

When an ArF laser irradiation test was carried out at low energy density as same as in Example 1, although changes in transmitted wave surface were not big as compared with Comparative Examples 1 and 2, progress of transmitted wave surface was observed at the irradiated area.

FIG. 3(g) shows the transmitted wave surface after irradiation of $1 \times 10^{10}$ pulses and it was confirmed that, in the irradiated area, rarefaction or damage by photorefractive effect was clearly resulted whereby the wave surface proceeded. As compared with the non-irradiated area, the transmitted wave surface of the irradiated area proceeded to an extent of about 0.6 nm per 1 cm thickness and, when the refractive index was assumed to change, it means that refractive index lowered to an extent of about $60 \times 10^{-9}$. The glass of this Comparative Example 5 contains a lot of SiOH and hydrogen molecules and that is believed to be one of the causes for resulting in rarefaction.

FIG. 4 shows the result of changes of transmitted wave surface measured every $2 \times 10^9$ pulses. It is confirmed that, even above $1 \times 10^{10}$ pulses, damage proceeds in a direction of proceeding the transmitted wave surface although in a gradual manner.

On the other hand, another test piece cut out from the resulting synthetic quartz glass material was irradiated with $1 \times 10^7$ pulses of ArF laser with an energy density of 10 mJ/cm$^2$p and changes in the transmitted wave surface were measured. The result was that, as same as in Example 1, the irradiated area shrank together with a density change and, as compared with the non-irradiated area, the transmitted wave surface delayed to an extent of about 5.7 nm per 1 cm thickness and, as compared with the Examples, somewhat big compaction damage was observed. That is believed to be due to the fact that b/a is 0.08 and amount of fluorine to SiOH is small and, in that case, compaction damage proceeds by a laser irradiation of high energy density.

Although the degree of damage was not so big in the synthetic quartz glass material of this Comparative Example 5, damage was observed both in the cases of irradiation of high and low energy densities whereby it is believed that, when such a quartz glass is used for actual exposure apparatus for the manufacture of semiconductors, it will greatly affect the imaging characteristic.

ADVANTAGE OF THE INVENTION

As mentioned hereinabove, the optical synthetic quartz glass material of the present invention is a synthetic quartz glass prepared by a flame hydrolysis method using a silicon compound as a material and is able to be appropriately used particularly for optical materials such as lens for exposure apparatus for the manufacture of semiconductors using ArF excimer laser. The synthetic quartz glass material of the present invention is a synthetic quartz glass where the transmitted wave surface is stable and does not change even when irradiation energy which is near the actual using condition of exposing apparatus is continued for a long period and also is a material showing an excellent laser resistance even when irradiated with a relatively high irradiation energy density.

In the synthetic quartz glass material of the present invention, a stable transmitted wave surface continues for a long period without causing damages such as compaction and rarefaction even when irradiated for a long period with a low energy density which is near the using condition for the actual exposure machine and the material is able to be advantageously used especially for lens materials of exposure machines.

In accordance with a method for the manufacture of an optical synthetic quartz glass material of the present invention, the optical synthetic quartz glass material of the present invention can be advantageously manufactured.

The invention claimed is:

1. An optical synthetic quartz glass article comprising a member that is made of synthetic quartz glass obtained by flame hydrolysis using a silicon compound as a raw material, said quartz glass having:
   a content A of SiOH that exceeds 10 wt ppm but that is not more than 400 wt ppm,
   a content B of fluorine in a range of 30 to 1000 wt ppm,
   hydrogen in a range of $0.1 \times 10^{17}$ to $10 \times 10^{17}$ molecules/$cm^3$,
   a fictive temperature in a range of 1073 K to 1323 K; and
   wherein the total of A and B is 100 wt ppm or higher and the ratio of B/A has a value in a range of 0.25 to 25;
   wherein irradiating said member with $1 \times 10^{10}$ pulses or more of ArF excimer laser radiation at an energy density per pulse of 0.3 mJ/$cm^2$ yields a change in transmission wave plane per 1 cm thickness that is in a range of −0.5 to +0.5 nm for a radiation of 632.8 nm; and
   wherein irradiating said member with $1 \times 10^7$ pulses or more of ArF excimer laser radiation at an energy density per pulse of 10 mJ/$cm^2$ yields a change in transmission wave plane per 1 cm thickness that is in a range of 0 to +5 nm for a radiation of 632.8 nm.

2. An optical synthetic quartz glass member as claimed in claim 1, wherein the member is free of striae in three directions, has an internal transmittance per 1 cm for a radiation having a wavelength of 193.4 nm that is 99.75% or higher, has a maximum birefringence for a radiation having a wavelength of 632.8 nm of 0.5 nm/cm, and has a homogeneity in transmittance of $2 \times 10^{-6}$ or lower.

3. A method for producing synthetic quartz glass article, comprising a member that is made of synthetic quartz glass obtained by flame hydrolysis using a silicon compound as a raw material, said quartz glass having a content A of SiOH that exceeds 10 wt ppm but that is not more than 400 wt ppm, a content B of fluorine in a range of 30 to 1000 wt ppm, hydrogen in a range of $0.1 \times 10^{17}$ to $10 \times 10^{17}$ molecules/$cm^3$, and wherein the total of A and B is 100 wt ppm or higher and the ratio of B/A has a value in a range of 0.25 to 25, wherein irradiating said member with $1 \times 10^{10}$ pulses or more of ArF excimer laser radiation at an energy density per pulse of 0.3 mJ/$cm^2$ yields a change in transmission wave plane per 1 cm thickness that is in a range of −0.5 to +0.5 nm for a radiation of 632.8 nm: and wherein irradiating said member with $1 \times 10^7$ pulses or more of ArF excimer laser radiation at an energy density per pulse of 10 mJ/$cm^2$ yields a change in transmission wave plane per 1 cm thickness that is in a range of 0 to +5 nm for a radiation of 632.8 nm, said method comprising:
   a) hydrolyzing a volatile silicon compound using an oxyhydrogen flame, and depositing fine silica particles generated thereby on a heat-resistant base body to obtain a porous preform;
   b) introducing fluorine into the preform by supporting the porous preform in an atmosphere containing a fluorine compound;
   c) obtaining a transparent quartz glass body by keeping the porous preform in a vacuum or in an inert gas-containing atmosphere at a temperature of 1673 K or higher;
   d) heating the transparent quartz glass body to a temperature that is not lower than a softening point of said quartz glass body while applying an external force, so as to remove striae by deformation;
   e) setting a fictive temperature in a range of 1073 K to 1323 K by holding the quartz glass body free of striae at a temperature not lower than a gradual cooling temperature, and gradually cooling the quartz glass body thereafter; and
   f) incorporating hydrogen molecules into the quartz glass body by applying to the quartz glass body having the fictive temperature thereof set in a range of 1073 K to 1323 K, a heat treatment in the range of 523 K to 773 K in a hydrogen-containing atmosphere.

* * * * *